US012619638B2

(12) United States Patent (10) Patent No.: US 12,619,638 B2

He et al. (45) Date of Patent: May 5, 2026

(54) SYSTEM FOR VERIFYING AMBIGUOUS ENTITIES IN DOCUMENTS

(71) Applicant: Infrrd Inc, San Jose, CA (US)

(72) Inventors: Jianglong He, New York City, NY (US); Deepak Kumar, Bengaluru (IN)

(73) Assignee: Infrrd Inc

( * ) Notice: Subject to any disclaimer, the term of this patent is extended or adjusted under 35 U.S.C. 154(b) by 211 days.

(21) Appl. No.: 18/403,758

(22) Filed: Jan. 4, 2024

(65) Prior Publication Data

US 2025/0225159 A1 Jul. 10, 2025

(51) Int. Cl.
G06F 16/3329 (2025.01)
G06F 16/334 (2025.01)
G06F 16/338 (2019.01)
G06F 40/279 (2020.01)

(52) U.S. Cl.
CPC ...... G06F 16/3329 (2019.01); G06F 16/3347 (2019.01); G06F 16/338 (2019.01); G06F 40/279 (2020.01)

(58) Field of Classification Search
CPC ............. G06F 16/3329; G06F 16/3347; G06F 16/338; G06F 40/279
See application file for complete search history.

(56) References Cited

U.S. PATENT DOCUMENTS

| | | | |
|---|---|---|---|
| 2022/0035856 A1* | 2/2022 | Gilder | G06F 16/583 |
| 2023/0205824 A1* | 6/2023 | Jablokov | G06F 16/93 |
| | | | 707/737 |
| 2023/0237512 A1* | 7/2023 | Kaur | G06F 16/353 |
| | | | 705/7.29 |
| 2025/0005058 A1* | 1/2025 | Khosla | G06F 16/3344 |

* cited by examiner

*Primary Examiner* — Sonia L Gay

(57) ABSTRACT

A system for verifying ambiguous entities in documents. The system comprises a processor configured to tag at least one entity in at least one page of a document, create an entity relationship among the tagged entities of each of the at least one page, receive a question from a user for the document, generate at least one corresponding answer for said question, generate an embedded question and an embedded corresponding answer for said question and each of the at least one corresponding answer, respectively, retrieve k-similar answers with associated labels for each of the at least one corresponding embedded answer for said question, and validate each of the corresponding at least one embedded answer if the labels associated with the embedded question, the corresponding at least one embedded answer, and each of the k-similar answers match.

8 Claims, 7 Drawing Sheets

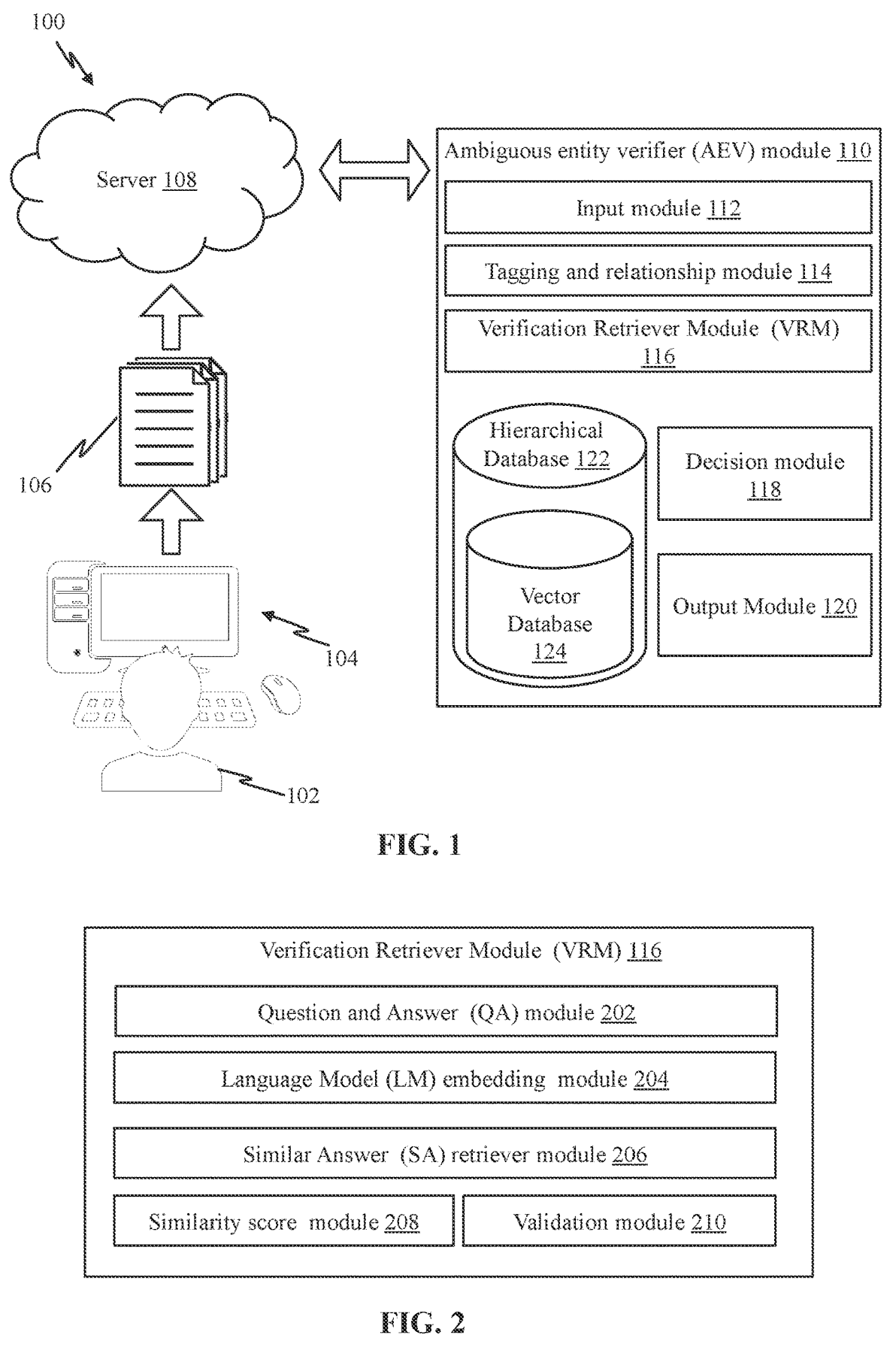

100

Server 108

Ambiguous entity verifier (AEV) module 110

Input module 112

Tagging and relationship module 114

Verification Retriever Module (VRM) 116

Hierarchical Database 122

Decision module 118

Vector Database 124

Output Module 120

Verification Retriever Module (VRM) 116

Question and Answer (QA) module 202

Language Model (LM) embedding module 204

Similar Answer (SA) retriever module 206

Similarity score module 208

Validation module 210

FIG. 2

Decision module 118

Context generator module 302          Pooling module 304

Language Model (LM) decoder 306

400

402

Tagging module 114 ⟷ Input module 112

QA module 202

LM embedding module 204

SA retriever module 206

Similarity score module 208

Validation module 210

VRM 116

Hierarchical Database 122

Vector Database 124

First VRM answer

404

500

| First VRM answer 404 | | |
|---|---|---|
| First Answer with label and first confidence score | First k-similar answers | |
| | First similar answer with label and similarity score | Kth similar answer with label and similarity score |

| Second VRM answer 502 | | |
|---|---|---|
| Second Answer with label and second confidence score | Second k-similar answers | |
| | First similar answer with label and similarity score | Kth similar answer with label and similarity score |

| Nth VRM answer 504 | | |
|---|---|---|
| Nth Answer with label and Nth confidence score | Nth k-similar answers | |
| | First similar answer with label and similarity score | Kth similar answer with label and similarity score |

Pooling module 304

Decision module 118

Context generator module 302

Language Model (LM) decoder 306

Output Module 120

FIG. 5

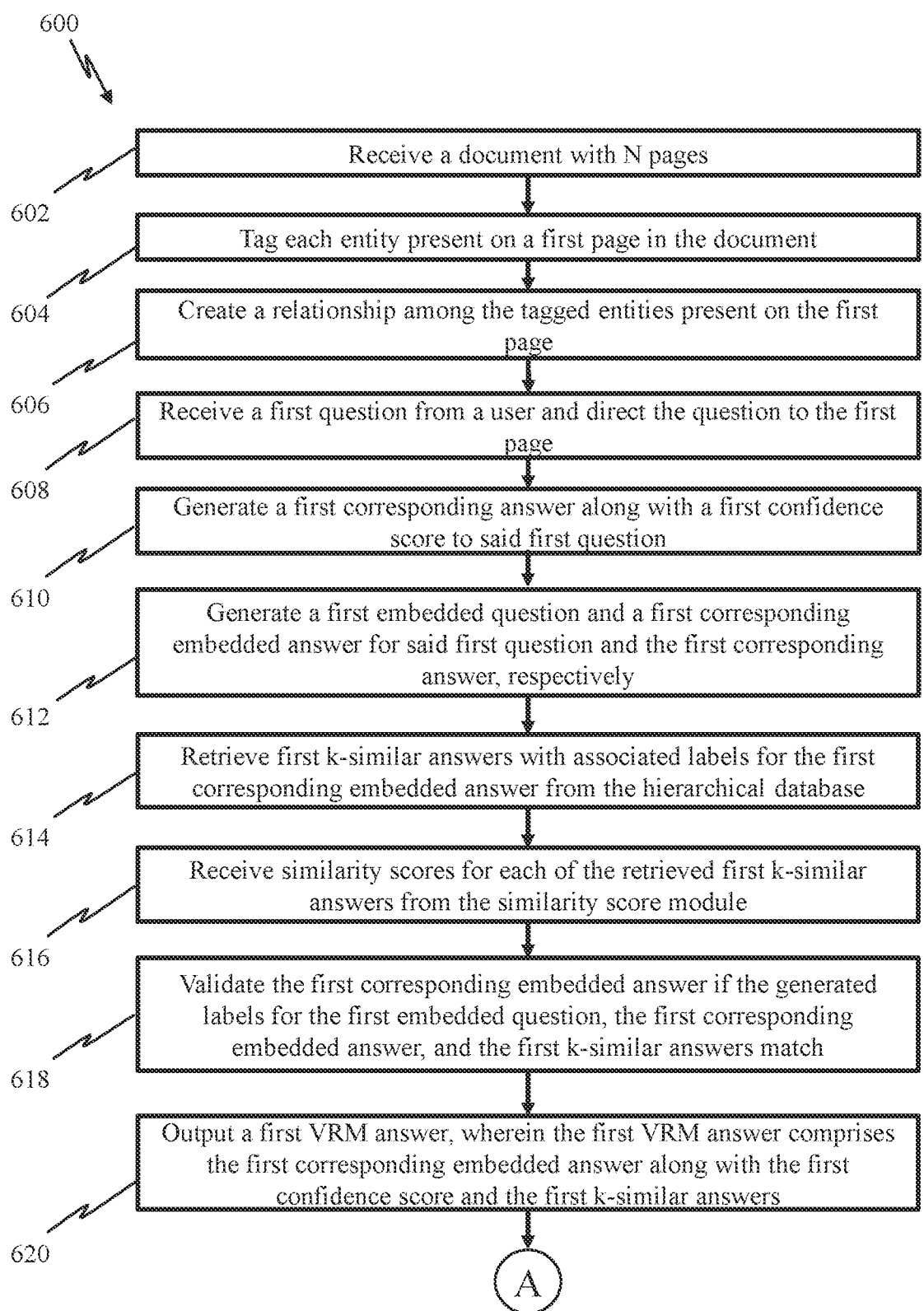

600

602 Receive a document with N pages

604 Tag each entity present on a first page in the document

606 Create a relationship among the tagged entities present on the first page

608 Receive a first question from a user and direct the question to the first page 610 Generate a first corresponding answer along with a first confidence score to said first question 612 Generate a first embedded question and a first corresponding embedded answer for said first question and the first corresponding answer, respectively 614 Retrieve first k-similar answers with associated labels for the first corresponding embedded answer from the hierarchical database 616 Receive similarity scores for each of the retrieved first k-similar answers from the similarity score module 618 Validate the first corresponding embedded answer if the generated labels for the first embedded question, the first corresponding embedded answer, and the first k-similar answers match 620 Output a first VRM answer, wherein the first VRM answer comprises the first corresponding embedded answer along with the first confidence score and the first k-similar answers

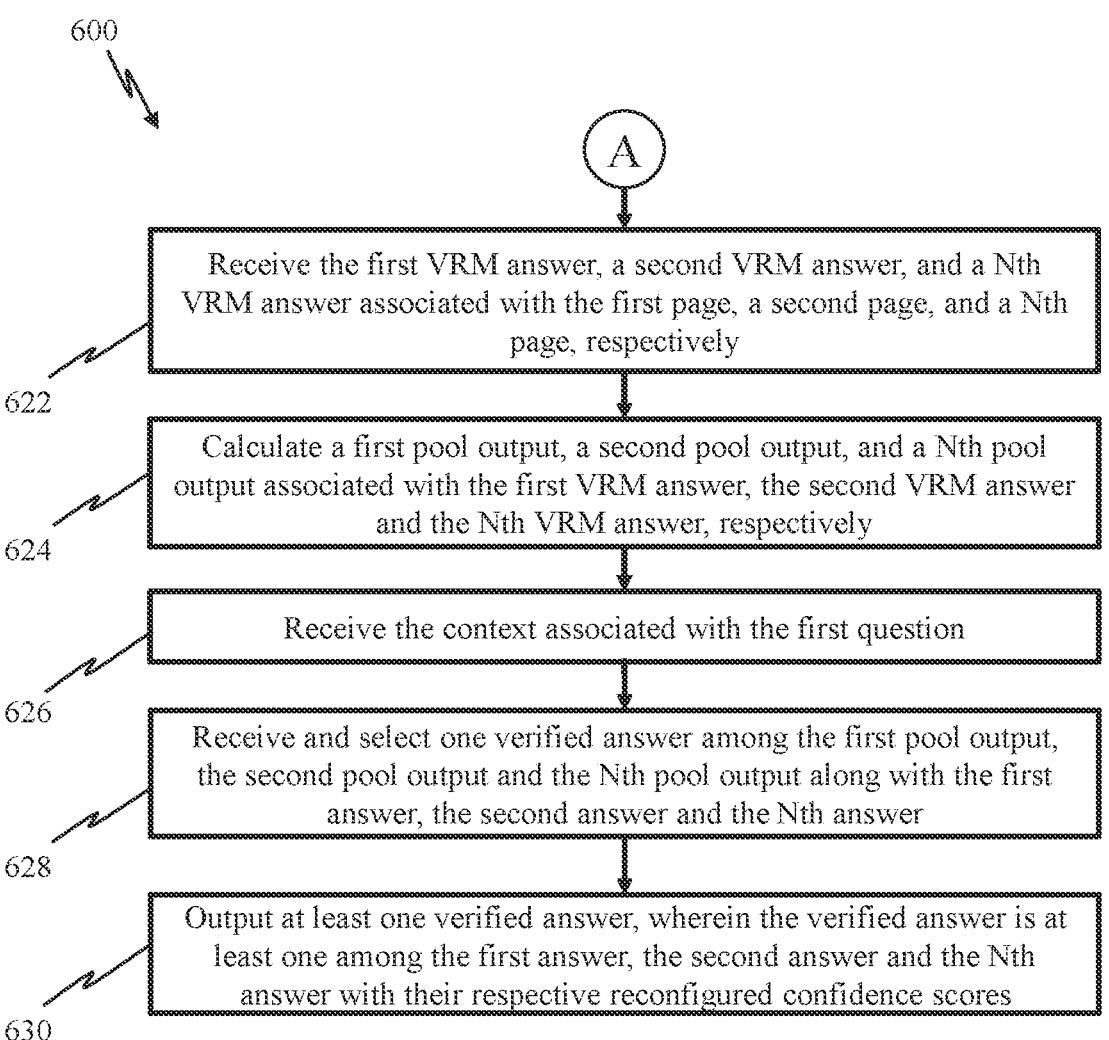

A

622 Receive the first VRM answer, a second VRM answer, and a Nth VRM answer associated with the first page, a second page, and a Nth page, respectively

624 Calculate a first pool output, a second pool output, and a Nth pool output associated with the first VRM answer, the second VRM answer and the Nth VRM answer, respectively

626 Receive the context associated with the first question

628 Receive and select one verified answer among the first pool output, the second pool output and the Nth pool output along with the first answer, the second answer and the Nth answer

630 Output at least one verified answer, wherein the verified answer is at least one among the first answer, the second answer and the Nth answer with their respective reconfigured confidence scores

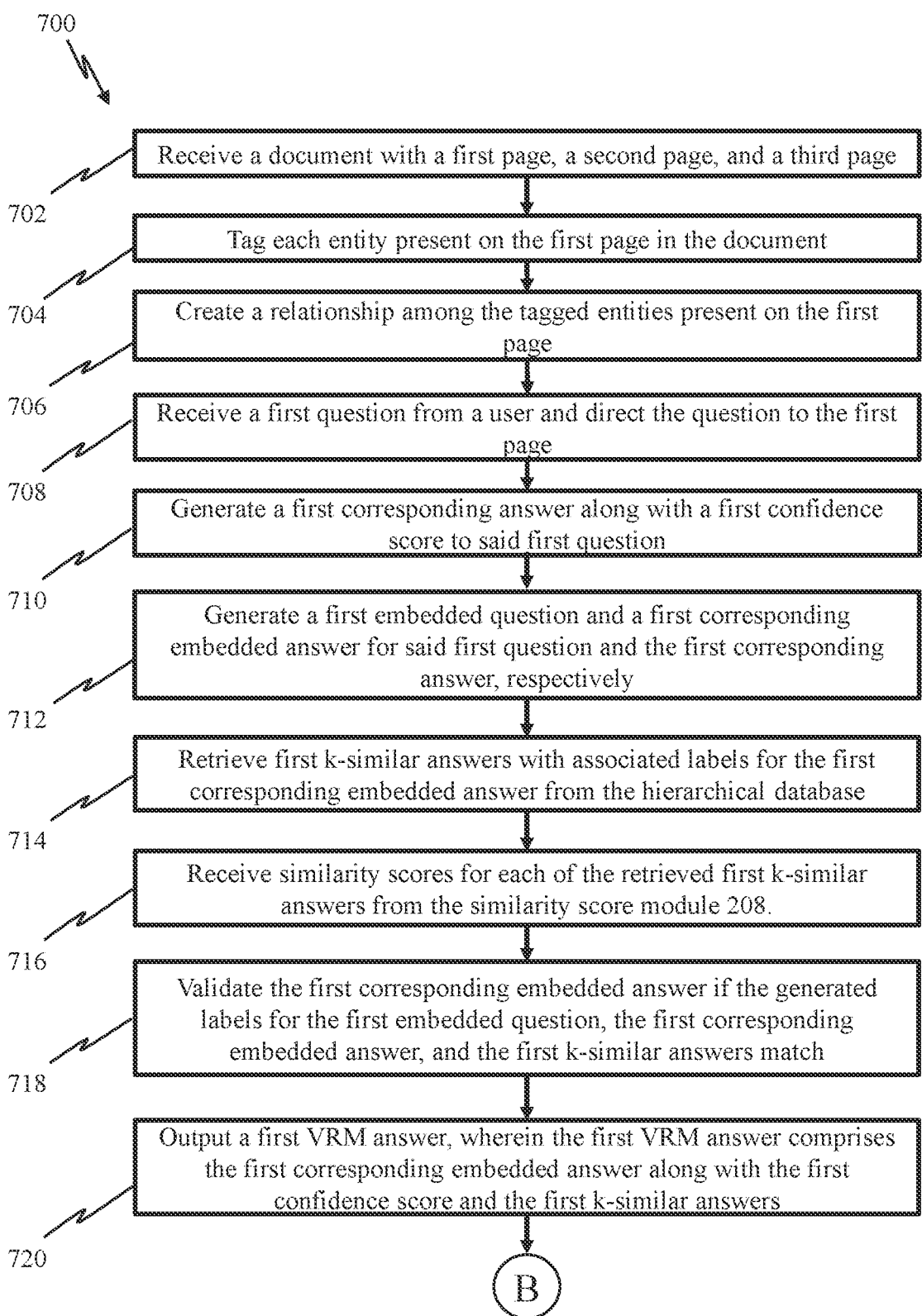

702    Receive a document with a first page, a second page, and a third page

704    Tag each entity present on the first page in the document

706    Create a relationship among the tagged entities present on the first page 708    Receive a first question from a user and direct the question to the first page 710    Generate a first corresponding answer along with a first confidence score to said first question 712    Generate a first embedded question and a first corresponding embedded answer for said first question and the first corresponding answer, respectively 714    Retrieve first k-similar answers with associated labels for the first corresponding embedded answer from the hierarchical database 716    Receive similarity scores for each of the retrieved first k-similar answers from the similarity score module 208.

718    Validate the first corresponding embedded answer if the generated labels for the first embedded question, the first corresponding embedded answer, and the first k-similar answers match 720    Output a first VRM answer, wherein the first VRM answer comprises the first corresponding embedded answer along with the first confidence score and the first k-similar answers

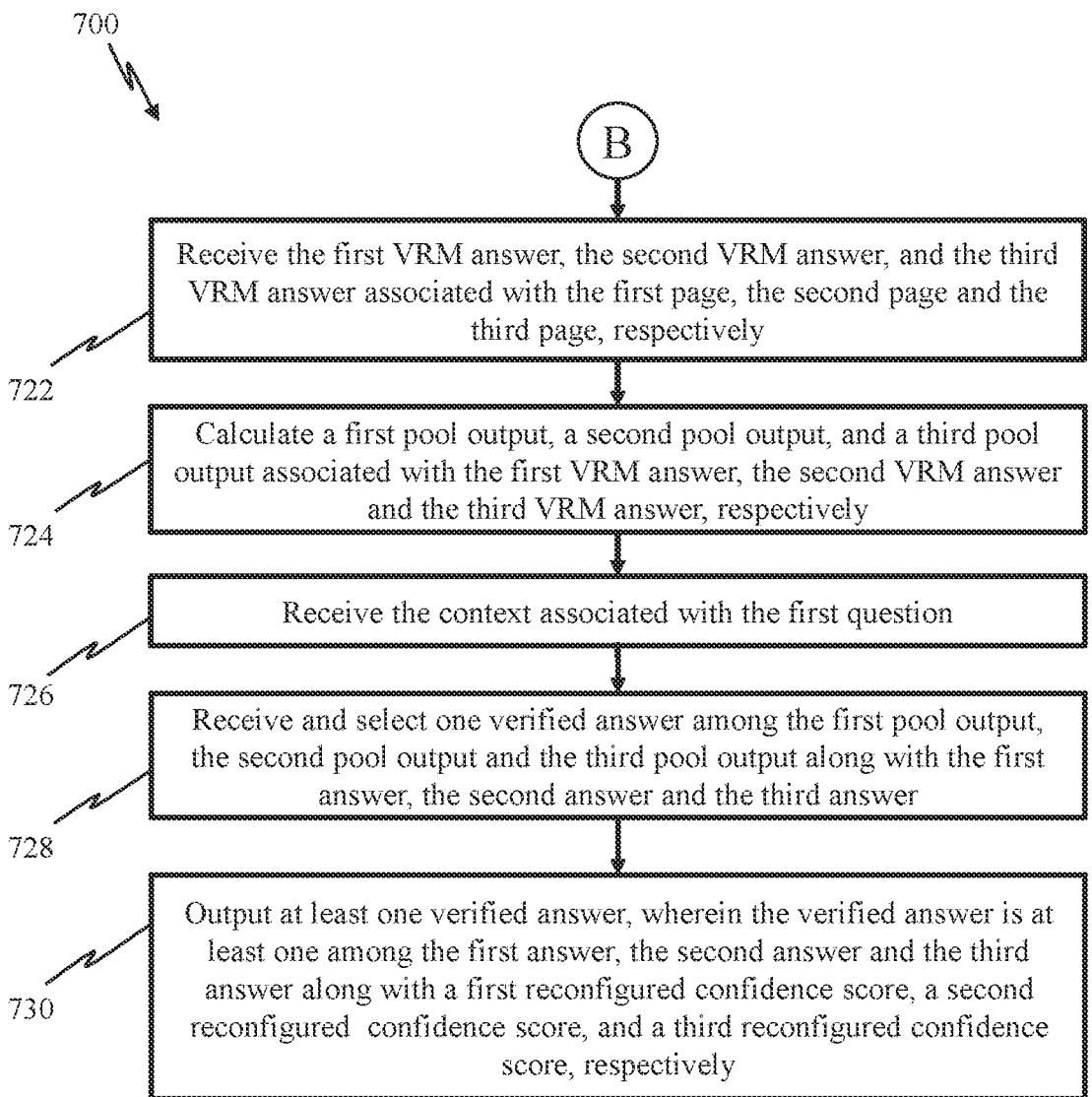

722

724

726

728

730

Receive the first VRM answer, the second VRM answer, and the third VRM answer associated with the first page, the second page and the third page, respectively Calculate a first pool output, a second pool output, and a third pool output associated with the first VRM answer, the second VRM answer and the third VRM answer, respectively Receive the context associated with the first question Receive and select one verified answer among the first pool output, the second pool output and the third pool output along with the first answer, the second answer and the third answer Output at least one verified answer, wherein the verified answer is at least one among the first answer, the second answer and the third answer along with a first reconfigured confidence score, a second reconfigured confidence score, and a third reconfigured confidence score, respectively

FIG. 7B

SYSTEM FOR VERIFYING AMBIGUOUS ENTITIES IN DOCUMENTS

FIELD OF THE INVENTION

This application relates generally to the field of verifying ambiguous entities in a document, more particularly, verifying the ambiguity of the entities present in the document based on the context.

BRIEF STATEMENT OF THE PRIOR ART

The increasing volume of digital information and documents poses significant challenges in accurately extracting and verifying entities with ambiguous references. Traditional document processing systems often struggle to appropriately tag and understand ambiguous entities within the documents, leading to potential misinterpretations and errors.

Current document processing systems typically lack the sophistication needed to handle ambiguous entities effectively. Ambiguous entities are those that may have multiple interpretations or meanings based on the context within a document. Conventional systems may fail to accurately tag such entities and establish their relationships within the document, leading to challenges in later retrieval and validation processes. Moreover, user queries about documents with ambiguous entities often yield suboptimal results from existing systems. The lack of context-awareness and advanced processing capabilities hampers the generation of relevant and accurate answers to user queries. In many cases, users may receive answers that do not fully consider the nuanced nature of ambiguous entities within the document.

The absence of a robust entity relationship mechanism in current systems further compounds the problem. Establishing connections and dependencies among tagged entities within a document is crucial for understanding the overall context and meaning. Existing systems often fall short in creating comprehensive entity relationships, limiting their ability to provide accurate and contextually relevant answers to user queries.

Due to the shortcomings in the currently available approaches, there is a need for an innovative Ambiguous Entity Verification System in Document Processing.

SUMMARY OF THE INVENTION

In an embodiment, a system for verifying ambiguous entities in documents is disclosed. The system comprising one or more processors configured to tag at least one entity in at least one page of a document, wherein tagging implies associating of a label with each of the entities. Further, the processor is configured to create an entity relationship among the tagged entities of each of the at least one page, receive a question from a user for the document, generate at least one corresponding answer for said question, generate an embedded question and an embedded corresponding answer for said question and each of the at least one corresponding answer, respectively. The processor is further configured to retrieve k-similar answers with associated labels for each of the at least one corresponding embedded answer for said question, and validate each of the at least one corresponding embedded answer, if the labels associated with the embedded question, the corresponding at least one embedded answer, and each of the k-similar answers match.

BRIEF DESCRIPTION OF DRAWINGS

Embodiments are illustrated by way of example and not limitation in the figures of the accompanying drawings, in which like references indicate similar elements and in which:

FIG. 1 illustrates a system 100 for verifying ambiguous entities in documents, in accordance with an embodiment.

FIG. 2 illustrates architecture of a Verification Retriever Module (VRM) 116, in accordance with an embodiment.

FIG. 5 illustrates a flowchart 500 depicting the working of the decision module 118 in the AEV module 110, in accordance with an embodiment.

FIGS. 6A and 6B illustrate a flowchart 600 verifying ambiguous entities in documents with N pages, in accordance with an embodiment.

FIGS. 7A and 7B illustrate a flowchart 700 verifying ambiguous entities in documents, in accordance with an example embodiment.

DETAILED DESCRIPTION

Figures 3, 4:
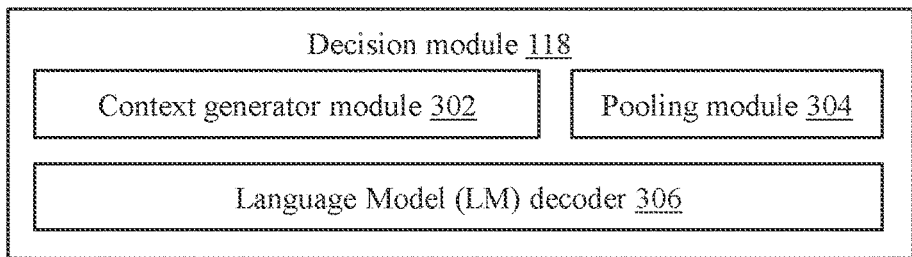
FIG. 3 illustrates architecture of a decision module 118, in accordance with an embodiment.
FIG. 4 illustrates a flowchart 400 depicting the working of VRM 116 in an Ambiguous entity verifier (AEV) module 110, in accordance with an embodiment.

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

FIG. 1 illustrates a system 100 for verifying ambiguous entities in documents, in accordance with an embodiment. The system 100 may comprise of a data processing system 104, a user 102 associated with the data processing system 104, a server 108, and an Ambiguous Entity Verifier (AEV) module 110.

In an embodiment, the server 102 may be configured to receive a document 106 from the user 102 via the data processing system 104.

In an embodiment, the server 102 may be configured to retrieve the document 106 from a database.

In an embodiment, the system 100 may be configured to receive a digital document, wherein at least one page of the document 106 is converted to an image. The system 100 may be configured to convert the document 106 into an image by means of photocopying, scanning, or any known process of converting a non-digital document into a digital document. Further, the system 100 may be configured to perform Optical Character Recognition (OCR) to extract text from the document 106.

In an embodiment, the AEV module 110 may comprise of an input module 112, a tagging and relationship module 114, a verification retriever module (VRM) 116, a decision module 118, an output module 120, and a hierarchical database 122. The input module 112 may be configured to receive the document 106. The tagging and relationship module 114 may be configured to tag (or label) each of the entities on each of the pages of the document and further create an entity relationship among the tagged entities. The decision module 118 may be configured to receive at least one validated answers and further determine a verified answer. Finally, the output module 120 may be configured to output the verified answer chosen by the decision module.

In an embodiment, a label associate module, which may be a part of the tagging and relationship module 114, may be configured to associate labels for plurality of vector embeddings, wherein vector embeddings may comprise of at least one question, at least one corresponding answer, and k-similar answers. The hierarchical database 122 may comprise of a vector database 124, wherein the vector database 124 may be configured to store plurality of vector embedding's with associated labels, wherein the hierarchical database 122 may be configured to store the plurality of vector embedding's and k-similar answers in a hierarchical manner.

FIG. 2 illustrates architecture of the VRM 116, in accordance with an embodiment. The VRM 116 may comprise of a Question and Answer (QA) module 202, a Language Model (LM) embedding module 204, a Similar Answer (SA) module 206, a similarity score module 208, and a validation module 210. The QA module 202 may be configured to direct question(s) asked by a user 102 to each page of the document 106, and generate at least one corresponding answer with a confidence score for said question. The LM embedding module 204 may be configured to generate an embedded question and an embedded corresponding answer for the question and each of the at least one corresponding answers, respectively. The SA retriever module 206 may be configured to retrieve k-similar answers from the hierarchical database 122. The similarity score module 208 may be configured to generate a similarity score for each of the retrieved k-similar answers. The validation module 210 may be configured to validate the corresponding embedded answer, if the generated labels of said embedded question, each of the corresponding at least one embedded answer, and each of the k-similar answers match.

In an embodiment, the system 100 may be configured to generate at least one question upon receiving documents for verification that pertain to a domain similar or identical to that of document 106.

In another embodiment, the system 100 may be configured to select at least one question from a plurality of questions stored in a database upon receiving documents for verification that pertain to a domain similar or identical to that of document 106, wherein the database may be configured to store plurality of questions utilized to train the AEV module 110.

FIG. 3 illustrates architecture of the decision module 118, in accordance with an embodiment. The decision module 118 may comprise of a context generator module 302, a pooling module 304, and a Language Model (LM) decoder 306. The context generator module 302 may be configured to generate a context associated with said question. The pooling module 304 may be configured to determine a pool output based on the similarity scores associated with each of the k-similar answers associated with each of the corresponding embedded answer. The LM decoder 306 may be configured to receive the at least one validated answer with their similarity scores and the context associated with said question and further may determine a verified answer, wherein the verified answer is among the at least one validated answer.

In an embodiment, the pool output may be a maximum pool value, wherein the maximum pool value may be the similarity score associated with one similar answer among the k-similar answers (embedded k-similar answers), wherein the said similar answer is closest to the corresponding embedded answer.

In yet another embodiment, the pool output may be a mean pool value, wherein the mean pool value may be the mean of similarity scores associated with k-similar answers.

In an embodiment, the hierarchical database 122 may be configured to store labels associated with the embedded question and each of the corresponding embedded answers in hierarchical manner. Further the hierarchical database 122 may be configured to store context associated with the question in hierarchical manner.

In an embodiment, the hierarchical database 122 may be configured to store all entity labels at a base level, store grouped entity labels at an advanced level, store entity label associated with the at least one question at a question level, and store a context at a context level, wherein the context comprises of vicinity, text and additional information associated with the entity.

FIG. 4 illustrates a flowchart 400 depicting the working of VRM 116 in the AEV module 110, in accordance with an embodiment. The input module 112 may receive a first page 402 associated with the document 106. The tagging and relationship module 114 may tag (or label) each entity present on the first page 402. The tagging and relationship module 114 may further create a relationship among the tagged entities. The QA module 202, upon receiving the first page 402, may receive a first question and generate a first corresponding answer with a first confidence score to the first question. The LM embedding module 204 may generate a first embedded question and a first embedded answer for the first question and the first corresponding answer, respectively. The SA retriever module 206 may retrieve first k-similar answers with associated labels for the first corresponding embedded answer from the hierarchical database 122. The SA retriever module 206 may be further configured to receive similarity scores for each of the first k-similar answers. The validation module 210 may be configured to validate the first corresponding embedded answer, if the generated labels of the first embedded question, the first corresponding embedded answer, and the first k-similar answers match. The VRM 116 may output a first VRM answer 404, wherein the first VRM answer 404 may comprise of the first corresponding embedded answer along with a first confidence score and the first k-similar answers.

In an embodiment, the first VRM answer 404 may be inputted to the decision module 118. The pooling module 304 may be configured to receive the first VRM answer and calculate a first pool output for the similarity scores associated with the first k-similar answers.

In an embodiment, the LM decoder 306 may receive the first answer along with the first pool output. Further, the LM decoder 306 may receive a first context associated with the first question. Finally, the output module 120 may output a verified answer, wherein the verified answer may be the first answer along with a reconfigured confidence score.

In an embodiment, the decision module 118 may be configured to generate the reconfigured confidence score based on the first confidence score generated by the QA module 202 and the similarity scores associated with the first k-similar answers.

In an embodiment, the VRM 116 may output the first VRM answer 404 for the first question from the first page 402. The same question (the first question) may be directed to other pages of the document 106 with N pages. Referring to FIG. 5, a second VRM answer 502 may be outputted by the VRM 116 for the first question from the second page. Similarly, a Nth VRM answer 504 may be outputted by the VRM 116 for the first question from the Nth page.

In an embodiment, the first VRM answer 404, the second VRM answer 502, and the Nth VRM answer 504 may be inputted to the decision module 118. The pooling module 304 may be configured to receive the first VRM answer and calculate a first pool output for the similarity scores associated with the first k-similar answers. Similarly, a second pool output and Nth pool output may be calculated for the similarity scores associated with the second k-similar answers and the Nth k-similar answers, respectively.

In an embodiment, the LM decoder 306 may receive the first answer, the second answer and the Nth answer with the first pool output, the second pool output, and the Nth pool output. Further, the LM decoder 306 may receive a first context associated with the first question. Finally, the output module 120 may output at least one verified answer, wherein the at least one verified answer is one among the at least one corresponding answers with their associated reconfigured confidence scores.

In an embodiment, the output module 120 may output at least one verified answer along with a confidence score associated with each of the at least one verified answer, wherein the at least one verified answer is one among the at least one corresponding answers.

FIGS. 6A and 6B illustrate a flowchart 600 verifying ambiguous entities in documents with N pages, in accordance with an embodiment. The embodiment described, in FIGS. 4-6B, is for understanding and does not limit the scope of the system 100. A document 106 may be received by the server 108, wherein the document 106 may comprise of 'N' pages, namely, a first page, a second page, up to Nth page.

At step 602, the input module 112 may be configured to receive the document 106 comprising the first page, the second page, up to Nth page.

At step 604, the tagging and relationship module 114 may be configured to tag each entity present on the first page in the document.

At step 606, the tagging and relationship module 114 may be configured to create a relationship among the tagged entities present on the first page.

At step 608, the QA module 202 may be configured to receive a first question from a user and may direct the question to the first page.

In an embodiment, the system 100 may be configured to generate the first question.

At step 610, the QA module 202 may be configured to generate a first corresponding answer along with a first confidence score to said first question.

At step 612, the LM embedding module 204 may be configured to generate a first embedded question and a first corresponding embedded answer for said first question and the first corresponding answer, respectively.

At step 614, the SA retriever module 206 may be configured to retrieve first k-similar answers with associated labels for the first corresponding embedded answer from the hierarchical database 122.

At step 616, the SA retriever module 206 may be configured to receive similarity scores for each of the retrieved first k-similar answers from the similarity score module 208.

At step 618, the validation module 210 may be configured to validate the first corresponding embedded answer, if the generated labels for the first embedded question, the first corresponding embedded answer, and the first k-similar answers match.

At step 620, the validation module 210 may be configured to output a first VRM answer, wherein the first VRM answer comprises the first corresponding embedded answer, the first confidence score, and the first k-similar answers.

The steps 604-620 are repeated for the second page up to the Nth page of the document, and are therefore not repeated herein for brevity.

Upon execution of steps 604-620 for the N pages, at step 622, the pooling module 304 may be configured to receive N VRM answers, namely, the first VRM answer, the second VRM answer, up to the Nth VRM answer associated with the first page, the second page, up to the Nth page, respectively.

At step 624, the pooling module 304 may be configured to calculate a first pool output, a second pool output, up to a Nth pool output associated with the first VRM answer, the second VRM answer, up to the Nth VRM answer, respectively.

In an embodiment, the first pool output may be the similarity score associated with one answer among the first k-similar answers, wherein the said answer is closest to the first corresponding embedded answer. Similarly, the second pool output may be the similarity score value associated with one answer among the second k-similar answers, wherein the said answer is closest to the second corresponding embedded answer and so on.

At step 626, the LM decoder 306 may be configured to receive the context associated with the first question.

At step 628, the LM decoder 306 may be configured to receive and select at least one verified answer among the first pool output, the second pool output up to the Nth pool output along with the first answer, the second answer up to the Nth answer.

At step 630, the output module 120 may be configured to output at least one verified answer, wherein the verified answer is at least one among the first answer with a first reconfigured confidence score, the second answer with a second reconfigured confidence score, up to the Nth answer with Nth reconfigured confidence score.

FIGS. 7A and 7B illustrate a flowchart 700 verifying ambiguous entities in documents, in accordance with an example embodiment. The example embodiment described is for understanding and does not limit the scope of the system 100. A document 106 is received by the server 108, wherein the document 106 comprises of three pages, namely, a first page, a second page, and a third page.

At step 702, the input module 112 is configured to receive the document 106 comprising the first page, the second page, and the third page.

At step 704, the tagging and relationship module 114 is configured to tag each entity present on the first page in the document.

At step 706, the tagging and relationship module 114 is configured to create a relationship among the tagged entities present on the first page.

At step 708, the QA module 202 is configured to receive a first question from a user and direct the question to the first page.

At step 710, the QA module 202 is configured to generate a first corresponding answer along with a first confidence score to said first question.

At step 712, the LM embedding module 204 is configured to generate a first embedded question and a first corresponding embedded answer for said first question and the first corresponding answer, respectively.

At step 714, the SA retriever module 206 is configured to retrieve first k-similar answers with associated labels for the first corresponding embedded answer from the hierarchical database 122.

At step 716, the SA retriever module 206 is configured to receive similarity scores for each of the retrieved first k-similar answers from the similarity score module 208.

At step 718, the validation module 210 is configured to validate the first corresponding embedded answer, if the generated labels for the first embedded question, the first corresponding embedded answer, and the first k-similar answers match.

At step 720, the validation module 210 is configured to output a first VRM answer, wherein the first VRM answer comprises the first corresponding embedded answer and the first k-similar answers.

The steps 704-720 are repeated for the second page and the third page of the document, and are not repeated herein for brevity.

Upon execution of steps 704-720 for said pages of the document 106, at step 722, the pooling module 304 is configured to receive the first VRM answer, the second VRM answer, and the third VRM answer associated with the first page, the second page and the third page, respectively.

At step 724, the pooling module 304 is configured to calculate a first pool output, a second pool output, and a third pool output associated with the first VRM answer, the second VRM answer and the third VRM answer, respectively.

In an embodiment, the first pool output may be the similarity score associated with one answer among the first k-similar answers, wherein the said answer is closest to the first corresponding embedded answer. Similarly, the second pool output may be the similarity score value associated with one answer among the second k-similar answers, wherein the said answer is closest to the second corresponding embedded answer. Lastly, the third pool output may be the similarity score value associated with one answer among the third k-similar answers, wherein the said answer is closest to the third corresponding embedded answer At step 726, the LM decoder 306 is configured to receive the context associated with the first question.

At step 728, the LM decoder 306 is configured to receive and select at least one verified answer among the first pool output, the second pool output and the third pool output along with the first answer, the second answer and the third answer.

At step 730, the output module 120 is configured to output at least one verified answer, wherein the verified answer is at least one among the first answer with a first reconfigured confidence score, the second answer with a second reconfigured confidence score and the third answer with a third reconfigured confidence score.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for verifying ambiguous entities in documents, the system comprising:

one or more processors configured to:

tag at least one entity in at least one page of a document, wherein:

the document is received by a server; and tagging associates a label with each of the entities;

create an entity relationship among the tagged entities of each of the at least one page;

receive a question from a user for the document;

generate at least one corresponding answer for said question;

generate an embedded question and an embedded corresponding answer for said question and each of the at least one corresponding answer, respectively;

retrieve k-similar answers with associated labels for each of the at least one corresponding embedded answer for said question; and validate each of the corresponding at least one embedded answer if the labels associated with the embedded question, the corresponding at least one embedded answer, and each of the k-similar answers match;

an Ambiguous Entity Verifier (AEV) module, wherein the AEV module comprises of:

an input module configured to receive the document;

a tagging and relationship module configured to:

label each of the entities on each of the pages of the document; and create an entity relationship among the tagged entities;

a hierarchical database comprises a vector database, wherein the vector database is configured to store plurality of vector embedding's with associated labels, wherein the hierarchical database is configured to store the plurality of vector embedding's and k-similar answers in a hierarchical manner;

a decision module configured to receive at least one validated answer and determine a verified answer, wherein the decision module comprises:

a context generator module configured to generate a context associated with said question;

a pooling module configured to determine a pool output based on the similarity scores associated with each of the k-similar answers associated with each of the corresponding embedded answer; and a Language Model (LM) decoder configured to:

receive the at least one validated answer with a confidence score and the context associated with said question; and determine the verified answer, wherein the verified answer is among the at least one validated answer; and an output module configured to output the verified answer chosen by the decision module; and a Verification Retriever Module (VRM), wherein the VRM comprises:

a Question and Answer (QA) module configured to:

direct the question to each of the at least one page of the document; and generate at least one corresponding answer along with the confidence score for said question;

a Language Model (LM) embedding module that is configured to generate the embedded question and the embedded corresponding answer for said question and each of the at least one corresponding answer, respectively;

a similar answer (SA) retriever module configured to retrieve the k-similar answers from the hierarchical database;

a similarity score module configured to generate a similarity score for each of the retrieved k-similar answers; and a validation module configured to validate the corresponding embedded answer if the generated labels of said embedded question, each of the corresponding at least one embedded answer, and each of the k-similar answers match.

2. The system according to claim 1, wherein the system is configured to receive a digital document, wherein:

at least one page of the document is converted to an image; and an optical character recognition is performed to extract text from said image.

3. The system according to claim 1, wherein the pool output is a maximum pool value, wherein the maximum pool value is the similarity score associated with one similar answer among the k-similar answers, wherein the said similar answer is closest to the corresponding embedded answer.

4. The system according to claim 1, wherein the pool output is a mean pool value, wherein the mean pool value is the mean of similarity scores associated with k-similar answers.

5. The system according to claim 1, wherein the hierarchical database is configured to:

store labels associated with the embedded question and each of the corresponding embedded answers in hierarchical manner; and store context associated with the question in hierarchical manner.

6. The system according to claim 5, wherein the hierarchical database is configured to:

store all entity labels at a base level;

store grouped entity labels at an advanced level;

store entity label associated with the question at a question level; and store the context at a context level, wherein the context comprises of vicinity, text and additional information associated with the entity.

7. A method for verifying ambiguous entities in documents, the method comprising the steps of:

receiving, by an input module, a document with at least a first page;

tagging, by a tagging and relationship module, each entity present on the first page in the document;

creating, by the tagging and relationship module, a relationship among the tagged entities present on the first page;

receiving from a user, by a Question and Answer (QA) module, a first question;

generating, by the Question and Answer (QA) module, a first corresponding answer along with a first confidence score to said first question;

generating, by a Language Model (LM) embedding module, a first embedded question and a first corresponding embedded answer for said first question and the first corresponding answer, respectively;

retrieving, by a Similar Answer (SA) retriever module, first k-similar answers for the first corresponding embedded answer, wherein the SA module is configured to:

retrieve k-similar answers with associated labels from a hierarchical database; and receive similarity scores for each of the k-similar answers;

validating, by a validation module, the first corresponding embedded answer if the generated labels for the first embedded question, the first corresponding embedded answer, and the first k-similar answers match;

outputting, by the validation module, a first Verification retriever module (VRM) answer, wherein the first VRM answer comprises the first corresponding embedded answer along with the first confidence score and the first k-similar answers;

receiving, by a pooling module the first VRM answer with the first answer and the k-similar answers associated with the first answer, wherein similarity scores are associated with the first k-similar answers;

calculating, by the pooling module a first pool output for the similarity scores associated with the k-similar answers associated with the first VRM answer;

receiving, by a Language Model (LM) decoder, the first VRM answer with the first pool output;

receiving, by the LM decoder, a first context associated with said first question; and outputting, by an output module, a first verified answer, wherein the first verified answer is the first answer with the first confidence score.

8. The method according to claim 7, wherein the method further comprising the steps of:

receiving, by the pooling module:

the first VRM answer with the first answer, the first confidence score, and the k-similar answers associated with the first answer, wherein similarity scores are associated with the first k-similar answers;

a second VRM answer with a second answer, a second confidence score, and second k-similar answers associated with the second answer, wherein similarity scores are associated with the second k-similar answers; and a Nth VRM answer with a Nth answer, a Nth confidence score, and Nth k-similar answers associated with the Nth answer, wherein similarity scores are associated with the Nth k-similar answers;

calculating, by the pooling module:

the first pool output for the similarity scores associated with the first k-similar answers;

a second pool output for the similarity scores associated with the second k-similar answers; and a Nth pool output for the similarity scores associated with the Nth k-similar answers;

receiving, by the Language Model (LM) decoder, the first answer with the first pool output, the second answer with the second pool output, the Nth answer with the Nth pool output;

receiving, by the LM decoder, at least one context associated with said first question; and outputting, by the output module, at least one verified answer, wherein the at least one verified answer is among the first answer with a first reconfigured confidence score, the second answer with a second reconfigured confidence score, and the Nth answer with a Nth reconfigured confidence score.

* * * * *